United States Patent [19]
Ikedo

[11] Patent Number: 5,864,344
[45] Date of Patent: Jan. 26, 1999

[54] COMPUTER GRAPHICS CIRCUIT

[76] Inventor: Tsuneo Ikedo, 238-39, Aza-gonohara, Oaza-kamega, Ikki-machi, Aizuwakamatsu-shi, Fukushima-ken, Japan

[21] Appl. No.: 793,680

[22] PCT Filed: Jul. 3, 1996

[86] PCT No.: PCT/JP96/01837

§ 371 Date: Feb. 28, 1997

§ 102(e) Date: Feb. 28, 1997

[87] PCT Pub. No.: WO97/02546

PCT Pub. Date: Jan. 23, 1997

[30] Foreign Application Priority Data

Jul. 3, 1995 [JP] Japan .................................... 7-201251
Apr. 9, 1996 [JP] Japan .................................... 8-122116

[51] Int. Cl.$^6$ .................................................. G06F 15/00
[52] U.S. Cl. ................................................... 345/426
[58] Field of Search ................................. 345/418, 426, 345/421, 422, 429, 432, 117, 118

[56] References Cited

U.S. PATENT DOCUMENTS 5,136,664  8/1992  Bersack et al. ...................... 345/441
5,440,682  8/1995  Deering et al. ...................... 345/503
5,745,125  4/1998  Deering et al. ...................... 345/426

*Primary Examiner*—Phu K. Nguyen
*Attorney, Agent, or Firm*—Kane, Dalsimer, Sullivan, Kurucz, Levy, Eisele and Richard, LLP

[57] ABSTRACT

A computer graphics circuit for rendering light-reflected gaseous object comprising a Gaussian random number generator, a parametric free curve interpolation circuit, a primitive-normal computation circuit, a shading circuit and frame buffer. The primitive of gaseous object is generated by a random number generator and applied these primitives to shading circuit to calculate the light-reflection after defining a normal of each primitive. The primitive is distributed centering around parametric free curve. The primitive stored into frame buffer is read synchronizing with video scanning and synthesized with surface-defined object using a z comparator, amultiplexer, multipliers and filters for defining transparency effect between gaseous object and surface-defined object.

8 Claims, 3 Drawing Sheets

COMPUTER GRAPHICS CIRCUIT

FIELD OF INVENTION

1. Field of the Invention

The described invention provides a computer graphics circuit to render gaseous image such as cloud, fog and steam. The circuit is comprised with gaussian random number generator, parametric free curve generator, filter and synthesizer of gaseous object and surface-defined object. This invention provides a real-time rendering of gaseous image in computer graphics and is applied to a graphics processor which is used for a visualization of virtual reality system.

2. Background Art

In a computer graphics, 3-dimensional object is often defined with surface or solid model and a realistic image is obtained by applying light-reflection to these defined objects. There are two schemes in rendering, polygon rendering and raytracing or radiosity. An image of natural phenomena such as fog and cloud which has a characteristics of complexity and dynamic change of shape is often rendered with raytracing algorithm. In the gaseous object, random light-reflection is also applied. Beside, it needs a synthesis with surface-defined object. Due to these large computation cost, there is no hardware circuit which is commercially available now for rendering the gaseous object as a volumed image but it has been rendered by software scheme. As the result, to display gaseous object with animation corresponding with a walk-through in virtual reality system has not yet realized up to now. A composition of 2-dimensional camera image or texture mapping technology has been used for it. This 2-dimensional approach limits the expressive power of 3-D scenes where viewer's eyes move into the gaseous object. Thus, to create the scene where the gaseous object dynamically flows before eyes needs the volume-rendering and the synthesis of gaseous object with surface-defined objects. A hardware implementation for these functions may be only way to realize a real-time rendering to cope with large computation cost. The implementation of real-time renderer for gaseous object in hardware has following processing: (1) definition of amorphous structured images with turbulent models; (2) shading with reflection; (3) transparency and filtering; (4) synthesis of gaseous and surface-defined objects. All of these processing have been considered to do only by software. This invention provides the hardware circuit for gaseous object rendering to get a realistic images in real time in virtual reality system.

SUMMARY OF THE INVENTION

This invention is specified a gaseous object rendering circuit comprising: (1) Gaussian random number generator to output quasi-random coordinates for positioning primitives of gaseous object. The gaseous objects are organized with hierarchical structures consisting of primitive, segment and object in this system. The segment consists of a mass of primitives (minimum particles) while the object is composed by combining multiple segments together; (2) interpolation circuit used to compute parametric free curve which defines a origin of segment (relative origin of primitives); (3) RAM(Random Access Memory) to store a predefined pattern which is mapped to each primitive to give a certain shape; (4) shading circuit to calculate a diffused reflection with normal vector of primitive and light-source. The normal vector is defined to have a opposite direction along to the straight line connected with the normal reference point and primitive point. The reference point is given arbitrary in 3-dimensional space for each segment; (5) means for defining overlapped number of primitive for getting a transparency in synthesis of gaseous and surface-defined object which are rendered independently. The overlapped number can be calculated when a destination primitive is already stored into frame buffer and executed a hidden primitive removal(using z-buffer). (6) means for reading intensity (intensity and overlapped number for gaseous object) and z value of both primitives from frame buffer synchronizing with a raster scanning and applying intensity and overlapped number of gaseous object to filters, and (7) means for blending images of gaseous and surface-defined object using the transparency value if the gaseous primitives is located nearer to eye-point than the surface-defined object comparing z values of both objects.

The invention of claim 2 described a modeling of gaseous object, comprises: (1) multiple random number circuits to generate segments which have locally high-density distribution of primitives defining a position of primitive of first group to be a origin of segment of next group, and repeating this origin-assignment for next group of primitive in hierarchical structure; (2) means for defining the transparency coefficient using the overlapped number. The overlapped number is filtered without modification if the gaseous primitive is located nearer to eye-point than surface-defined object and with modification of overlapped number to specified value if it is far from the surface defined object.

The invention further comprises the circuit to control the distribution and density of segment by moving the origin of segment with specified speed along with a parametric free curve in parallel with generating the random numbers. The circuit comprises a counter to calculate knot value of parametric curve, RAM table to store non-linear value and is addressed by output data of the counter, and DDA(Digital Differencial Analizer) to integrate the value of RAM at a fractional part of DDA. The non-linear value of RAM defines a non-linear speed-ratio for moving origin.

The invention further is to get an effect of movement of the primitives with animation, comprising: (1) means for generating primitives and interpolating free curve to define each different operating cycle. The operating cycle of random number generator has a value which is added the interpolation-cycle with specified value; (2) comprising a counter to interpolate the full range of free curve and a counter to define the cycle of random number generator; (3) control circuit of counter in order to move the primitive along a free curve, initializing interpolation circuit every video refresh while the random number generator generates primitives cyclically.

As per the above description, this invention provides a real-time rendering of gaseous object and surface-defined object with light-reflection in 3-dimensional space and is useful for a virtual reality of walk-through system.

DETAILED DESCRIPTION OF THE PREFERRED IMPLEMENTATIONS

§ 1. Gaseous object renderer

Figure 1:
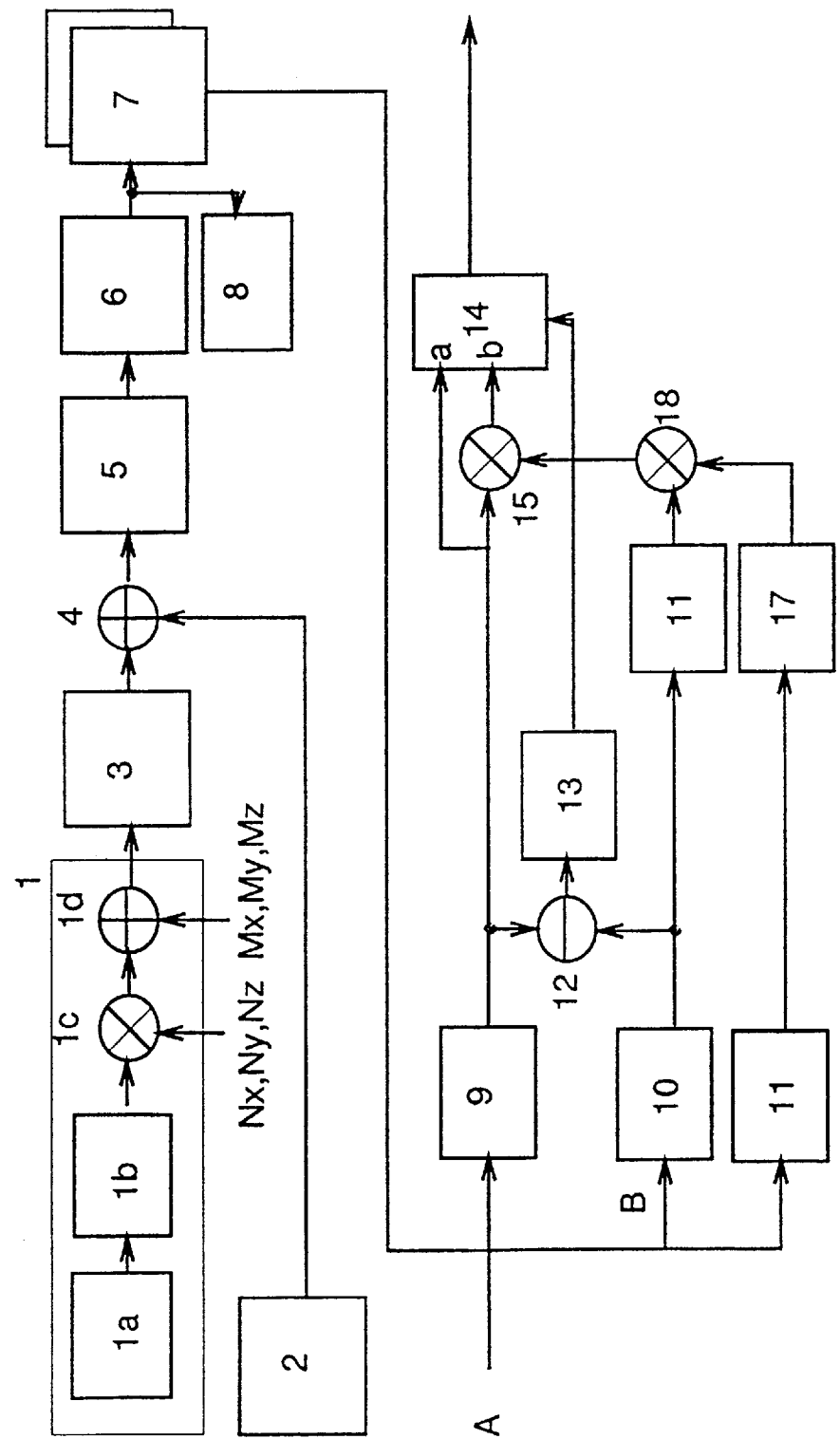
FIG. 1 is a block diagram of the circuit of gaseous object renderer.

This invention is a circuit to generate a gaseous object and synthesize it with surface-defined object. FIG. 1 shows the renderer of gaseous object comprising a Gaussian random number generator 1 to generate 3-dimensional coordinates of Gaussian distribution, a parametric free curve generator 2 to define a reference-point (origin) of primitives, and the RAM 3 to store the pre-defined pattern to be mapped to a primitive of gaseous object. The Gaussian random number generator 1 is further comprised with a random number generator 1a, a Gaussian function table 1b, multiplier 1c and adder 1d. The random number generator 1a is configured with shift register and exclusive OR gates. It outputs the random number synchronizing with operation-clock after an initial value is loaded into this shift register. Nx, Ny, Nz and Mx, My, Mz in FIG. 1 are the values to define density and distribution of random number in 3-dimensional space respectively. The coordinates from the random number generator 1 is added with the interpolated value from the parametric free curve generator 2 by adder 4. Thus, interpolated value becomes a origin of each segment if it is changed every segment. A normal vector is defined at every primitive specifying a normal reference-point for each segment. This normal is given by two angle values, Nh and Nv as $Nh=\arctan(x/z)$, $Nv=\arcsin(y/r)$. Where x, y, z are distance between the primitive and normal reference-points, and r is given $\operatorname{root}(x2+y2+z2)$. This calculation is carried out by normal calculation circuit 5. Nh and Nv are given to shading circuit 6 and the reflected intensity is computed by following equations;

$$Ip = Id \cos$$

$$\cos = \cos Nv + \{\cos Lv[\cos(Lh-Lh)-1]\} + \cos(Lv-Nv)$$

where Ip, Id, Lh, and Lv are reflected intensity, diffusion coefficient, and horizontal and vertical angles of light-source respectively. This reflection-intensity is stored into frame buffer 7. A hidden surface removal circuit 8 calculates a overlapped number if any value is already stored into the frame buffer when the intensity is written into the frame buffer as new source data. The overlapped number is incremented one by one if destination data is pre-stored in the frame buffer. In the frame buffer 7, the intensity, z value and overlapped number are stored and read them synchronizing with the video scanning of display device. Synthesizer is configured with z comparator, filter and transparency converter and blending circuit.

A surface-defined object is rendered at specified processor independent from the gaseous object renderer. Pixel of surface-defined object is stored into the frame buffer and read synchroning with video scanning as the same way of the gaseous object. It is also applied to the synthesizer. The pixels of surface-defined object are applied to input A of FIG. 1 and loaded sequentially to shift register 9 while the data of gaseous object are applied to input B and loaded to shift register 10 and 11. The data of surface-defined object include z value and intensity of surface, while the data of gaseous object include z value, intensity and overlapped number. Z value is read first and intensity is next order with specified length and cycle. In this invention, the length is defined 256 pixels. Z, intensity and overlapped value are generally configured with 24, 8 and 8-bit respectively. Z values received from input A and B are compared at comparator 12 first and then the result is sequencially stored into shift register 13. After the comparison, the pixels at shift register 9 are transferred to multiplexer 14 or multiplier 15. The data at input B are loaded to shift register 10 for calculation of intensity and shift register 11 for overlapped number. The intensity is filtered at circuit 16 consisted of RAM, and multiplier and adder. The overlapped number is converted to a value of transparency coefficient by RAM 17. This transparency coefficient is applied to multiplier 18 and synthesized with the surface-defined object at multiplier 15. In the multiplexer 14, it selects a-input if the data of shift register 13 selects the input A or b-input data from the multiplier 15 which is applied the transparency coefficient if it is in reverse. In this way, it is obtained the synthesized image in real time synchronizing with a video refresh with pipeline processing.

§ 2. Primitive generator and Synthesizer

Figure 2:
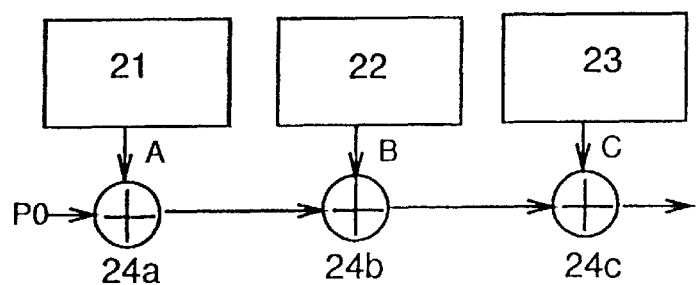
FIG. 2 is a block diagram of the generator of gaseous primitive.

This invention is to generate the primitive with high-density distribution and synthesize gaseous and surface-defined objects with filtering of primitive. Attention is directed to FIG. 2 which shows generator of primitive. The gaseous primitive in 3-dimensional space is generated by the random number generator 21 with Gaussian distribution. This circuit is the same one as described in previous section (circuit 1 of FIG. 1). The circuit 22 and 23 have same architecture as the circuit 21. The output-coordinate A from the circuit 21 is added with a reference point p0 from parametric free curve generator at adder 24a. It is given to adder 24b as an origin of coordinate B from the circuit 22. Thus, second primitive-position is defined p0+A+B at output of adder 24b. This coordinate is further added with a coordinate C at adder 24c, so that final output-coordinate of primitives is defined p0+A+B+C by three level configurations. It can be obtained segment which has a primitive in specified locality by defining distribution and density parameters independently in the circuits 21–23.

Figure 3:
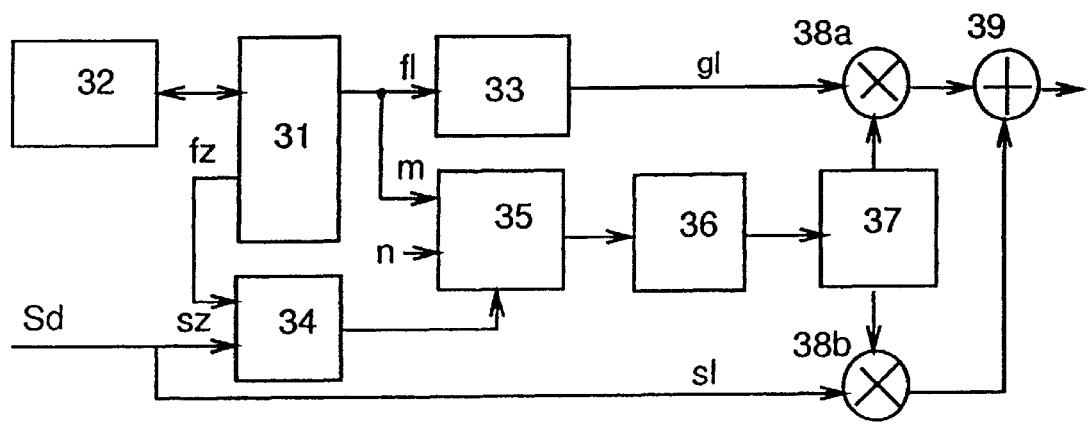
FIG. 3 is a block diagram of the filtering circuit.

Attention is directed to FIG. 3 which shows the synthesizer of gaseous and surface-defined object. The primitive generated in the circuits shown in FIG. 2 is stored into frame buffer 31. The overlapped number is calculated at hidden surface removal circuit 32 when the primitive is written into the frame buffer 31. Intensity(fl), z value ((fz), and overlapped number (m) are read from the frame buffer synchronizing with video scanning of display device. The intensity (fl) is applied to filter 33 z value (fz) is compared with z value (sz) of surface-defined object at comparator 34 and applied its result to selector 35. At the selector 35, it selects overlapped number (m) itself if primitive of gaseous object is in front of surface-defined object, while it selects zero or specified value (n) if the primitive is in behind of surface-defined object. The selected overlapped number is then applied to second filter 36 and converted to the transparency coefficient at RAM 37. The RAM table is defined with following equation.

$$Alha = t \times A(1-B-CN)$$

where t is a transparency coefficient. A, B, and C are variables depended on material characteristics. N is a over-lapped number.

The synthesized intensity is given by the following equation using multipliers 38a and 38b, and adder 39 to multiply intensity of gaseous primitive (gl) and intensity of surface object (sl) with the transparency coefficient respectively.

$$I = k \, (gl) \, Alha + (sl)(1 - Alha)$$

where I is a synthesized intensity and k is an intensity coefficient.

§ 3. Diffused gaseous object generator

Figure 4:
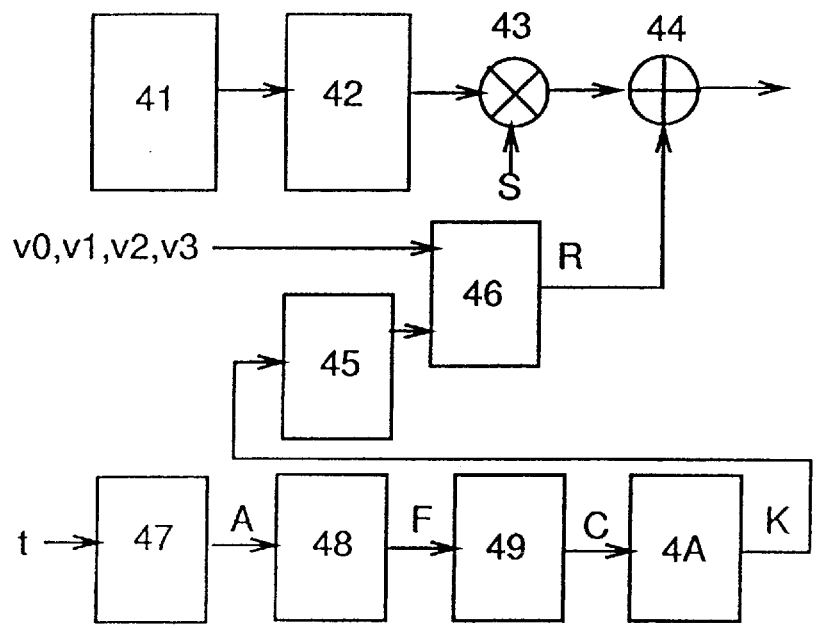
FIG. 4 is a block diagram of the generator for non-linear knot value.
Figure 5:
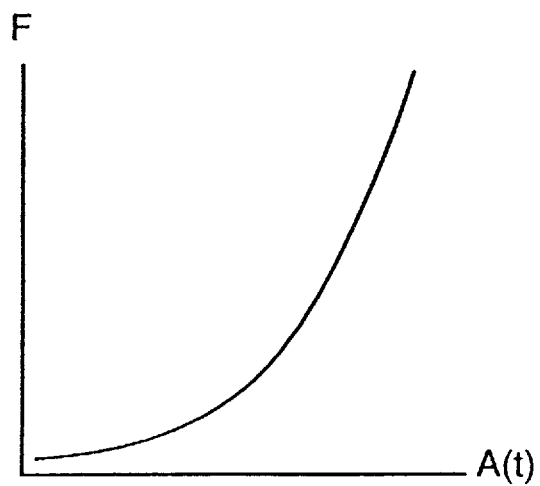
FIG. 5 is a block diagram of the RAM table stored non-linear value.

This invention is to generate a diffused gaseous object. Attention is directed to FIG. 4 which shows the gaseous object generator. In FIG. 4, the primitive which has a Gaussian distribution is generated by random number generator 41 and Gaussian distribution function table 42. It is preferable to define the mathematical model of parametric curve for positioning the center of Gaussian distribution if the shape of gaseous object should be modified easily. As shown in FIG. 4, the primitive can get an absolute coordinate by scaling (at scaler 43) output value from the Gaussian distribution table 42, and adding (at adder 44) the scaled value with coordinate R on free curve. R is an interpolated value given by an interpolation circuit. It is obtained by multiplier and adder 46 which compute coordinate with knot function table 45 and curve-control point v0, v1, v2, and v3. Knot value k takes 0<=k<=1 and k is applied to the table 45. In the case that k value is changed uniformly with constant time-interval, the shape of segment is rendered with uniform density. However, because real gaseous object do not have a uniform shape, this invention changes the density of segment by controlling speed of moving the origin of primitive on the free curve without changing the value of random number and knot-distance. This control can be obtained by a counter 47 with clock t, RAM 48 stored non-linear values, and DDA 49 and 4A. The RAM 48 stores value shown in FIG. 5 and the value is loaded to fractional part register 49 of DDA as a incremented value F. The fractional part of DDA 49 consists of adder and register. The carry signal C of the adder increments the value of integer part. This circuit increments the counter 4A every clock if the output data from RAM 48 are all 1. Thus, the counter 4A is changed its rate of incrementation according to the value of RAM 48. It gives non-linear incrementation if the value of RAM is defined as shown in FIG. 5.

The output of counter 4A is applied to the knot table 45. The table-value and control-point are multiplied and added in the circuits 46 and then the reference-point is obtained. The counter 4A is reset when the interpolation of free curve is finished and moves interpolation to next curve, while the counter 7 operates cyclically. Distribution of primitive defined by the random number generator can be controlled by scaler 43 for its diffusion. Scaling value S can be defined by using the similar circuits of counter 7, RAM 48, DDA 49 and counter 4A. As per the above-described implementation, this invention can generate the segment of cylindrical or zonal shape by changing the data of RAM 48. This speed control circuit can be implemented by attaching the RAM 48 at the output of DDA 4A or using microprogram to increment the counter 4A instead of using the circuit of fractional part of DDA. However, it is a same idea in the method as long as the distribution and density are controlled by changing the speed along to the free curve. It is necessary for a real-time rendering to move the position of primitive every moment in the object. To get a effect which the primitives move (similar movement of smoke which goes up) along to the free curve is obtained with following definitions: (1) define a cycle of random number generator 41 adding specified time with the interpolation time of free curve; (2) start both operations of random number and interpolation of free curve, initialize the interpolation circuit every starting of interpolation while the random number generator operates cyclically. If the cycle of random number generation differs from the cycle of interpolation, the coordinate of random number generator at specified interpolated position on free curve is getting different from previous position every rendering. The difference of cycles between the random number generator and interpolation circuit defines a movement ratio of primitive-position.

In the case where multiple free curves and segment are defined, it is necessary to memorize the value of random number generator 41 at every end of interpolation, and use it at next refresh cycle for generating primitive by loading this memorized value to the generator 41.

As per the above-described implementation, this invention provides the real-time rendering of gaseous object in hardware. To put these renderings in hardware makes possible to implement the generator of gaseous object within an ASIC. This technology will play a important role for establishing a virtual reality system.

What is claimed is:

1. Computer graphics circuit comprising;

means for defining segment of gaseous object which is composed by primitive, generating said primitive as a minimum particle by a random number generator which specifies coordinate, density and distribution of said primitive in three-dimensional space, defining a origin of said segment on a free curve, comprising a interpolation circuit to compute said parametric free curve, and modeling a gaseous object with said segments;

means for computing a normal of each said primitive by defining a normal reference-point for each segment;

means for computing a light-reflected intensity of said primitive by using said normal and light-source direction;

means for applying hidden primitive removal when said primitive is stored into a frame buffer, selecting said intensity and z value of either of primitives which is nearer to eye-point, incrementing overlapped number at each position if primitive is already stored at destination of frame buffer; and means for synthesizing said gaseous object and surface-defined object applying transparency coefficient which is obtained by filtering of intensity and overlapped number of gaseous object.

2. A computer graphics circuits as described in claim 1, wherein said means of generating said primitive and synthesizing with surface-defined object in three-dimensional space, comprising;

means for generating first primitive using a circuit with random number generator and probability distribution function table, generating second primitive centring around said first primitive using another circuit which has a same architecture as said first one generating a primitive in this way using equal of more than two circuits;

means for generating said gaseous object defining specified density and distribution based on a probability distribution-function independently in each said circuit;

means for calculating the number of overlapped writing of primitive at a same position of frame buffer;

means for filtering said intensity of primitive, comparing z coordinates of said primitive with said surface-defined object, filtering said overlapped number converted to specified value depending on the location of primitive near or far from surface-defined object; and means for defining a transparency coefficient using said overlapped number to be filtered, multiplying said transparency coefficient with said intensity of primitive and surface-defined object respectively, and synthesizing images by adding said intensities of primitive and surface-defined object.

3. A computer graphics circuit described in claim 1, comprising;

means for generating knot value of said free curve using a counter, RAM table stored non-linear value, and DDA in order to shape gaseous object which has an arbitrary density and distribution, controlling computation of said knot value to get a non-uniformed movement of primitive origin along to said free curve; and means for controlling a diffusion of primitive by scaling in parallel with said non-linear movement of said origin comprising a scalar at output of said random number generator.

4. A computer graphics circuit described in claim 2, comprising;

means for generating knot value of said free curve using a counter, RAM table stored non-linear value, and DDA in order to shape gaseous object which has an arbitrary density and distribution, controlling computation of said knot value to get a non-uniformed movement of primitive origin along to said free curve; and means for controlling a diffusion of primitive by scaling in parallel with said non-linear movement of said origin comprising a scalar at output of said random number generator.

5. A computer graphics circuit described in claim 1, wherein comprising said random number generator with shift register and exclusive OR gates, further circuit comprising;

means for defining a cycle for generating said random number with a time which is added specified time with a time taken for interpolating of said free curve from starting point to end point; and means for generating said random number cyclically in said cycle while said interpolation of free curve is intialized every video refresh cycle.

6. A computer graphics circuit described in claim 2, wherein comprising said random number generator with shift register and exclusive OR gates, further circuit comprising;

means for defining a cycle for generating said random number with a time which is added specified time with a time taken for interpolating of said free curve from starting point to end point; and means for generating said random number cyclically in said cycle while said interpolation of free curve is intialized every video refresh cycle.

7. A computer graphics circuit described in claim 3, wherein comprising said random number generator with shift register and exclusive OR gates, further circuit comprising;

means for defining a cycle for generating said random number with a time which is added specified time with a time taken for interpolating of said free curve from starting point to end point; and means for generating said random number cyclically in said cycle while said interpolation of free curve is intialized every video refresh cycle.

8. A computer graphics circuit described in claim 4, wherein comprising said random number generator with shift register and exclusive OR gates, further circuit comprising;

means for defining a cycle for generating said random number with a time which is added specified time with a time taken for interpolating of said free curve from starting point to end point; and means for generating said random number cyclically in said cycle while said interpolation of free curve is intialized every video refresh cycle.

* * * * *